US009289729B2

(12) United States Patent
Roy et al.

(10) Patent No.: US 9,289,729 B2
(45) Date of Patent: Mar. 22, 2016

(54) COMPOSITE POLYAMIDE MEMBRANE DERIVED FROM CARBOXYLIC ACID CONTAINING ACYL HALIDE MONOMER

(71) Applicant: Dow Global Technologies LLC, Midland, MI (US)

(72) Inventors: Abhishek Roy, Edina, MN (US); Steven D. Jons, Eden Prairie, MN (US); Joseph D. Koob, Jordan, MN (US); Martin H. Peery, Bloomington, MN (US); XiaoHua Sam Qiu, Midland, MI (US); Steven Rosenberg, Shorewood, MN (US); Ian A. Tomlinson, Midland, MI (US)

(73) Assignee: Dow Global Technologies LLC

( * ) Notice: Subject to any disclaimer, the term of this patent is extended or adjusted under 35 U.S.C. 154(b) by 473 days.

(21) Appl. No.: 13/844,839

(22) Filed: Mar. 16, 2013

(65) Prior Publication Data

US 2014/0272134 A1     Sep. 18, 2014

(51) Int. Cl.
*B01D 71/56*     (2006.01)
*B01D 69/10*     (2006.01)
*B01D 69/12*     (2006.01)

(52) U.S. Cl.
CPC ............... *B01D 71/56* (2013.01); *B01D 69/10* (2013.01); *B01D 69/125* (2013.01)

(58) Field of Classification Search
CPC .................................................. B01D 67/0093
See application file for complete search history.

(56) References Cited

U.S. PATENT DOCUMENTS

| | | |
|---|---|---|
| 3,304,310 A | 2/1967 | Hari et al. |
| 3,686,116 A | 8/1972 | Rio |
| 3,694,390 A | 9/1972 | Winslow |
| 3,878,109 A | 4/1975 | Ikeda et al. |
| 4,259,183 A | 3/1981 | Cadotte |
| 4,265,745 A | 5/1981 | Kawaguchi et al. |
| 4,277,344 A | 7/1981 | Cadotte |
| 4,529,646 A | 7/1985 | Sundet |
| 4,606,943 A | 8/1986 | Rak et al. |
| 4,626,468 A | 12/1986 | Sundet |
| 4,643,829 A | 2/1987 | Sundet |
| 4,719,062 A | 1/1988 | Sundet |
| 4,758,343 A | 7/1988 | Sasaki et al. |
| 4,761,234 A | 8/1988 | Uemura et al. |
| 4,769,148 A | 9/1988 | Fibiger et al. |
| 4,783,346 A | 11/1988 | Sundet |
| 4,812,270 A | 3/1989 | Cadotte et al. |
| 4,830,885 A | 5/1989 | Tran et al. |
| 4,872,984 A | 10/1989 | Tomaschke |
| 4,888,116 A | 12/1989 | Cadotte et al. |
| 4,948,507 A | 8/1990 | Tomaschke |
| 4,950,404 A | 8/1990 | Chau |
| 4,960,517 A | 10/1990 | Cadotte |
| 5,015,380 A | 5/1991 | Sundet |
| 5,015,382 A | 5/1991 | Sundet |
| 5,019,264 A | 5/1991 | Arthur |
| 5,049,282 A | 9/1991 | Linder et al. |
| 5,051,178 A | 9/1991 | Uemura et al. |
| 5,160,619 A | 11/1992 | Yamaguchi et al. |
| 5,180,802 A | 1/1993 | Hartman et al. |
| 5,246,587 A | 9/1993 | Tomaschke |
| 5,254,261 A | 10/1993 | Tomaschke et al. |
| 5,290,452 A | 3/1994 | Schucker |
| 5,336,409 A | 8/1994 | Hachisuka et al. |
| 5,510,527 A | 4/1996 | Hachisuka et al. |
| 5,576,057 A | 11/1996 | Hirose et al. |
| 5,582,725 A | 12/1996 | McCray et al. |
| 5,593,588 A | 1/1997 | Kim et al. |
| 5,614,099 A | 3/1997 | Hirose et al. |
| 5,616,249 A | 4/1997 | Hodgdon |
| 5,693,227 A | 12/1997 | Costa |
| 5,733,602 A | 3/1998 | Hirose et al. |
| 5,736,371 A | 4/1998 | Samain et al. |
| 5,744,039 A | 4/1998 | Itoh et al. |
| 5,783,079 A | 7/1998 | Kumano et al. |
| 5,843,351 A | 12/1998 | Hirose et al. |
| 5,876,602 A | 3/1999 | Jons et al. |
| 5,989,426 A | 11/1999 | Hirose et al. |
| 6,024,873 A | 2/2000 | Hirose et al. |
| 6,086,764 A | 7/2000 | Linder et al. |
| 6,162,358 A | 12/2000 | Li et al. |
| 6,245,234 B1 | 6/2001 | Koo et al. |
| 6,280,853 B1 | 8/2001 | Mickols |

(Continued)

FOREIGN PATENT DOCUMENTS

| | | |
|---|---|---|
| CN | 1035338 | 7/1997 |
| CN | 1935338 | 3/2007 |

(Continued)

OTHER PUBLICATIONS

Petersen, composite reverse osmosis and nanofiltration membranes, Journal of Membrane Science 83, (1993) 81-150.
Marvel, et al., Journal of Organic Chemistry, vol. 18, No. 12, (1953) 1664-1669.
Dow Global Technologies LLC, PCT/US13/020072, filed Jan. 3, 2013.
Li et al., Polyamide thin fim composite membranes prepared from isomeric biphenyl tetrraacyl chloride and m-phenylenediamine, Journal of Membrane Science 315, (2008) 20-27.

(Continued)

Primary Examiner — Alex A Rolland

(57) ABSTRACT

A method for making a composite polyamide membrane comprising the step of applying polyfunctional amine and acid halide monomers to a surface of a porous support and interfacially polymerizing the monomers to form a thin film polyamide layer. The method further includes the step of conducting the interfacial polymerization in the presence of: a carboxylic acid monomer comprising an aliphatic or aromatic moiety substituted with single carboxylic acid functional group and at least one acyl halide functional group, and a tri-hydrocarbyl compound.

14 Claims, No Drawings

(56) References Cited

U.S. PATENT DOCUMENTS

| | | |
|---|---|---|
| 6,337,018 B1 | 1/2002 | Mickols |
| 6,406,626 B1 | 6/2002 | Murakami et al. |
| 6,464,873 B1 | 10/2002 | Tomaschke |
| 6,521,130 B1 | 2/2003 | Kono et al. |
| 6,562,266 B2 | 5/2003 | Mickols |
| 6,723,241 B2 | 4/2004 | Mickols |
| 6,723,422 B1 | 4/2004 | Hirose et al. |
| 6,777,488 B1 | 8/2004 | Araki et al. |
| 6,878,278 B2 | 4/2005 | Mickols |
| 7,279,097 B2 | 10/2007 | Tomioka et al. |
| 7,806,275 B2 | 10/2010 | Murphy et al. |
| 7,815,987 B2 | 10/2010 | Mickols et al. |
| 7,882,963 B2 | 2/2011 | Mickols et al. |
| 7,905,361 B2 | 3/2011 | Niu et al. |
| 7,918,349 B2 | 4/2011 | Mickols et al. |
| 8,147,735 B2 | 4/2012 | Buschmann |
| 8,177,978 B2 | 5/2012 | Kurth et al. |
| 2001/0050252 A1* | 12/2001 | Mickols .................... 210/490 |
| 2008/0185332 A1 | 8/2008 | Niu et al. |
| 2009/0071903 A1 | 3/2009 | Nakatsuji et al. |
| 2009/0107922 A1 | 4/2009 | Zhang et al. |
| 2009/0220690 A1 | 9/2009 | Niu et al. |
| 2009/0272692 A1 | 11/2009 | Kurth et al. |
| 2010/0062156 A1 | 3/2010 | Kurth et al. |
| 2011/0005997 A1 | 1/2011 | Kurth et al. |
| 2011/0049055 A1 | 3/2011 | Wang et al. |
| 2011/0220569 A1 | 9/2011 | Mickols et al. |
| 2012/0248027 A1 | 10/2012 | Sasaki et al. |
| 2012/0261332 A1 | 10/2012 | Takagi et al. |
| 2012/0261344 A1 | 10/2012 | Kurth et al. |
| 2012/0305473 A1 | 12/2012 | Ogawa et al. |
| 2013/0089727 A1 | 4/2013 | Nilsen et al. |
| 2013/0126419 A1 | 5/2013 | Ogawa et al. |
| 2013/0256215 A1 | 10/2013 | Nakatsuji et al. |
| 2013/0287944 A1 | 10/2013 | Paul et al. |
| 2013/0287945 A1 | 10/2013 | Roy et al. |
| 2013/0287946 A1 | 10/2013 | Jons et al. |
| 2014/0170314 A1 | 6/2014 | Zhang et al. |
| 2014/0199483 A1 | 7/2014 | Roy et al. |
| 2014/0206900 A1 | 7/2014 | Qiu et al. |
| 2014/0264161 A1 | 9/2014 | Roy et al. |
| 2014/0264162 A1 | 9/2014 | Qiu et al. |
| 2014/0295078 A1 | 10/2014 | Paul et al. |
| 2014/0370191 A1 | 12/2014 | Rosenberg et al. |

FOREIGN PATENT DOCUMENTS

| | | |
|---|---|---|
| CN | 102219673 | 10/2011 |
| DE | 2530562 | 1/1977 |
| EP | 0302149 | 2/1989 |
| EP | 0556569 | 8/1993 |
| JP | 53146275 | 12/1978 |
| WO | 2009129354 | 10/2009 |
| WO | 2010042250 | 4/2010 |
| WO | 2010120326 | 10/2010 |
| WO | 2010120327 | 10/2010 |
| WO | 2011105278 | 9/2011 |
| WO | 2011152735 | 12/2011 |
| WO | 2012020680 | 2/2012 |
| WO | 2012090862 | 7/2012 |
| WO | 2012102942 | 8/2012 |
| WO | 2012102943 | 8/2012 |
| WO | 2012102944 | 8/2012 |
| WO | 2013032586 | 3/2013 |
| WO | 2013048762 | 4/2013 |
| WO | 2013048763 | 4/2013 |
| WO | 2013048764 | 4/2013 |
| WO | 2013048765 | 4/2013 |
| WO | 2013103666 | 7/2013 |
| WO | 2014014662 | 1/2014 |
| WO | 2014014663 | 1/2014 |
| WO | 2014014664 | 1/2014 |
| WO | 2014014666 | 1/2014 |
| WO | 2014014668 | 1/2014 |
| WO | 2014014669 | 1/2014 |
| WO | 2014109946 | 7/2014 |
| WO | 2014109947 | 7/2014 |
| WO | 2014179024 | 11/2014 |

OTHER PUBLICATIONS

U.S. Appl. No. 61/818,934, filed May 3, 2013 by Mou Paul, et al.
International Application PCT/US2014/010123, filed Jan. 3, 2014 by Dow Global Technologies LLC.

* cited by examiner

COMPOSITE POLYAMIDE MEMBRANE DERIVED FROM CARBOXYLIC ACID CONTAINING ACYL HALIDE MONOMER

FIELD OF THE INVENTION

The present invention is directed toward composite membranes along with methods for making and using the same.

DESCRIPTION OF THE RELATED ART

Composite polyamide membranes are used in a variety of fluid separations. One common class of membranes includes a porous support coated with a "thin film" polyamide layer. The thin film layer may be formed by an interfacial polycondensation reaction between polyfunctional amine (e.g. m-phenylenediamine) and polyfunctional acyl halide (e.g. trimesoyl chloride) monomers which are sequentially coated upon the support from immiscible solutions, see for example U.S. Pat. No. 4,277,344 to Cadotte. Various constituents may be added to one or both of the coating solutions to improve membrane performance. For example, U.S. Pat. No. 4,259,183 to Cadotte describes the use of combinations of bi- and tri-functional acyl halide monomers, e.g. isophthaloyl chloride or terephthaloyl chloride with trimesoyl chloride. U.S. Pat. No. 6,878,278 to Mickols describes the addition of a wide range of complexing agents to the acyl halide coating solution, including various phosphorous containing species. U.S. Pat. No. 6,521,130 describes the addition of a carboxylic acid (e.g. aliphatic and aromatic carboxylic acids) or carboxylic acid ester to one or both monomer coating solutions prior to polymerization. US 2009/0272692, US 2010/0062156, US 2011/0005997, WO 2009/129354, WO 2010/120326 and WO 2010/120327 describe the use of various polyfunctional acyl halides and their corresponding partially hydrolyzed counterparts. The search continues for new additives that offer improved membrane performance.

BRIEF SUMMARY OF THE INVENTION

The invention includes a method for making a composite polyamide membrane comprising the steps of applying polyfunctional amine and acid halide monomers to a surface of a porous support and interfacially polymerizing the monomers to form a thin film polyamide layer. The method further includes the step of conducting the interfacial polymerization in the presence of: i) a carboxylic acid monomer comprising an aliphatic or aromatic moiety substituted with single carboxylic acid functional group and at least one acyl halide functional group, and ii) a tri-hydrocarbyl compound. The invention includes many additional embodiments.

DETAILED DESCRIPTION OF THE INVENTION

The invention is not particularly limited to a specific type, construction or shape of composite membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF) and micro filtration (MF) fluid separations. However, the invention is particularly useful for membranes designed for RO and NF separations. RO composite membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF composite membranes are more permeable than RO composite membranes and typically reject less than about 95% of salts having monovalent ions while rejecting more than about 50% (and often more than 90%) of salts having divalent ions-depending upon the species of divalent ion. NF composite membranes also typically reject particles in the nanometer range as well as organic molecules having molecular weights greater than approximately 200 to 500 Daltons.

Examples of composite polyamide membranes include FilmTec Corporation FT-30™ type membranes, i.e. a flat sheet composite membrane comprising a bottom layer (back side) of a nonwoven backing web (e.g. PET scrim), a middle layer of a porous support having a typical thickness of about 25-125 µm and top layer (front side) comprising a thin film polyamide layer having a thickness typically less than about 1 micron, e.g. from 0.01 micron to 1 micron but more commonly from about 0.01 to 0.1 µm. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 µm. In some instances pore diameters larger than about 0.5 µm permit the polyamide layer to sag into the pores and disrupt a flat sheet configuration. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m$^2$. The polyamide layer is preferably prepared by an interfacial polycondensation reaction between a polyfunctional amine monomer and a polyfunctional acyl halide monomer upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from a hydrocarbon solution (also referred to herein as "organic-based" or "non-polar" solution). Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl)amine). Examples of preferred polyfunctional amine monomers include primary amines having two or three amino groups, for example, m-phenylene diamine, and secondary aliphatic amines having two amino groups such as piperazine. One preferred polyfunctional amine is m-phenylene diamine (mPD). The polyfunctional amine monomer may be applied to the porous support as a polar solution. The polar solution may contain from about 0.1 to about 20 weight percent and more preferably from about 0.5 to about 6 weight percent polyfunctional amine monomer. Once coated on the porous support, excess solution may be optionally removed.

The polyfunctional acyl halide monomer comprises at least two acyl halide groups and is preferably coated from a hydrocarbon solvent (e.g. organic-based or non-polar solvent) although the polyfunctional acyl halide may be delivered from a vapor phase (e.g., for polyfunctional acyl halides having sufficient vapor pressure). The polyfunctional acyl halide is not particularly limited and aromatic or alicyclic polyfunctional acyl halides can be used along with combinations thereof. Non-limiting examples of aromatic polyfunctional acyl halides include: trimesic acid chloride, terephthalic acid chloride, isophthalic acid chloride, biphenyl dicarboxylic acid chloride, and naphthalene dicarboxylic acid dichloride. Non-limiting examples of alicyclic polyfunctional acyl halides include: cyclopropane tri carboxylic acid chloride, cyclobutane tetra carboxylic acid chloride, cyclopentane tri carboxylic acid chloride, cyclopentane tetra carboxylic acid chloride, cyclohexane tri carboxylic acid chloride, tetrahydrofuran tetra carboxylic acid chloride, cyclopentane dicarboxylic acid chloride, cyclobutane dicarboxylic acid chloride, cyclohexane dicarboxylic acid chloride, and tetrahydrofuran dicarboxylic acid chloride. One preferred polyfunctional acyl halide is trimesoyl chloride (TMC).

The polyfunctional acyl halide may be dissolved in a hydrocarbon solvent in a range from about 0.01 to 10 weight percent, preferably 0.05 to 3 weight percent and may be delivered as part of a continuous coating operation. Suitable hydrocarbon solvents are those which are capable of dissolving the polyfunctional acyl halide and which are immiscible with water, e.g. the solvent preferably has a water solubility of less than 800 ppm (and more preferably less than 500, 400, 300, or 200, or in some embodiments, less than 150 ppm). As used herein, the term "water solubility" refers to the concentration of water that is soluble in a chosen hydrocarbon solvent measured at 20° C. (101 kPa) as measured by ASTM D4928-11. The selection of hydrocarbon solvent is not particularly limited and combinations of multiple solvents may be used. The solvent is preferably a liquid at 20° C. (101 kPa). Non-limiting examples of applicable hydrocarbon solvents include: paraffins (e.g. hexane, cyclohexane, heptane, octane, dodecane), isoparaffins (e.g. ISOPAR™ L), aromatics (e.g. benzene, 1,3,5-trimethylbenzene, toluene,) and halogenated hydrocarbons (e.g. FREON™ series, chlorobenzene, di- and tri-chlorobenzene).

Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed).

The reaction time of the polyfunctional acyl halide and the polyfunctional amine monomer may be less than one second but contact times typically range from about 1 to 60 seconds, after which excess liquid may be optionally removed by way of an air knife, water bath(s), dryer or the like. The removal of the excess solvent can be achieved by drying at elevated temperatures, e.g. from about 40° C. to about 120° C., although air drying at ambient temperatures may be used.

In one embodiment, the invention further includes the step of conducting the interfacial polymerization in the presence of: a carboxylic acid monomer and a tri-hydrocarbyl compound. The carboxylic acid monomer comprises an aliphatic or aromatic moiety substituted with single carboxylic acid functional group and at least one acyl halide functional group. In a preferred set of embodiments, the carboxylic acid monomer has a molecular weight less than: 700, 600, 500, 400 or 300 Daltons. In another set of embodiments, the carboxylic acid monomer comprises equal to or less than 30, 20, 15 or 12 carbon atoms, and preferably includes more than 3 carbon atoms. In yet another set of embodiments, the monomer comprises from 4 to 12 carbon atoms. Non-limiting examples of carboxylic acid monomers based upon aliphatic moieties include: 4-chloro-4-oxobutanoic acid, 5-chloro-5-oxopentanoic acid, 6-chloro-6-oxohexanoic acid, 7-chloro-7-oxoheptanoic acid, 8-chloro-8-oxooctanoic acid, 9-chloro-9-oxononanoic acid, 10-chloro-10-oxodecanoic acid, 11-chloro-11-oxoundecanoic acid, 12-chloro-12-oxododecanoic acid; 3-(chlorocarbonyl)cyclobutanecarboxylic acid, 3-(chlorocarbonyl)cyclopentane carboxylic acid, 2,4-bis(chlorocarbonyl)cyclopentane carboxylic acid, 3,5-bis(chlorocarbonyl)cyclohexanecarboxylic acid, and 4-(chlorocarbonyl)cyclohexanecarboxylic acid. Non-limiting examples of monomers based upon aromatic moieties include: 4-(chlorocarbonyl)benzoic acid, 3,5-bis(chlorocarbonyl)benzoic acid, 7-(chlorocarbonyl)-2-naphthoic acid and 5,7-bis(chlorocarbonyl)-2-naphthoic acid. Additional examples of applicable monomers include branched analogs of the preceding species along analogs including additional acyl halide functional groups.

Examples of applicable tri-hydrocarbyl phosphate compounds are represented by Formula (I):

Formula (I):

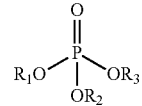

wherein "P" is phosphorous, "O" is oxygen and $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen. $R_1$, $R_2$ and $R_3$ are preferably independently selected from aliphatic and aromatic groups. Applicable aliphatic groups include both branched and unbranched species, e.g. methyl, ethyl, propyl, isopropyl, butyl, isobutyl, pentyl, 2-pentyl, 3-pentyl, cyclopentyl, cyclohexyl, etc.; however, alkyl groups having from 3 to 10 carbon atoms are preferred. Applicable aromatic groups include phenyl and naphthyl groups. Specific examples of tri-hydrocarbyl phosphate compounds include: tripropyl phosphate, tributyl phosphate, tripentyl phosphate, trihexyl phosphate, triphenyl phosphate, propyl biphenyl phosphate, dibutyl phenyl phosphate, butyl diethyl phosphate, dibutyl hydrogen phosphate, butyl heptyl hydrogen phosphate and butyl heptyl hexyl phosphate. Additional examples are described in U.S. Pat. No. 6,878,278, U.S. Pat. No. 6,723,241, U.S. Pat. No. 6,562,266 and U.S. Pat. No. 6,337,018.

The carboxylic acid monomer and tri-hydrocarbyl compound may be combined within a hydrocarbon solvent (wherein the solvent is selected based upon the same criteria as previously described with reference to the polyfunctional acyl halide monomer) to form a coating solution which is applied upon the porous support, e.g. within a few seconds before or after a coating of the polyfunctional acyl halide is applied, or is combined with the polyfunctional acyl halide and applied upon the porous support as a single solution.

In another embodiment, the carboxylic acid monomer may be formed in-situ by adding water to a coating solution comprising the hydrocarbon solvent, polyfunctional acyl halide monomer and tri-hydrocarbyl phosphate compound. For example, the aforementioned constituents may be combined to form a solution preferably comprising at least 80 v/v % hydrocarbon solvent, and in some embodiments at least 90 v/v %, 92 v/v % or 95 v/v % hydrocarbon solvent along with optionally one or more of the following: i) water at a molar concentration greater than its solubility limit (e.g. concentration greater than 10% of solubility limit) within the solvent but less that its solubility limit with the hydrocarbon solution, ii) the polyfunctional acyl halide at a molar concentration less than its solubility limit within the solvent and at a molar ratio with water from 1:2 to 1000:1, and iii) the tri-hydrocarbyl phosphate compound at a molar ratio with the polyfunctional acyl halide from 100:1 to 1:1000. In a preferred embodiment, the solution comprises the tri-hydrocarbyl phosphate compound at a molar ratio with the polyfunctional acyl halide from 10:1 to 1:100. In another embodiment, the solution comprises the polyfunctional acyl halide at a molar ratio with water of from 1:2 to 200:1, and in other embodiments from 1:2 to 100:1. In still another embodiment, the solution includes at least one but preferably all of the following: water at a concentration of less than 1 wt %, the polyfunctional acyl halide at a concentration of less than 10 wt % or the tri-hydrocarbyl phosphate compound at a concentration of less than 10 wt %. In yet other set of embodiments, the hydrocarbon solution includes at least one but preferably all of the following: water at a concentration of less than 0.5 wt %, the polyfunctional acyl halide at a concentration of less than 5 wt %, or the tri-hydrocarbyl phosphate compound at a concentration of less than 5 wt %. Representative reaction pathways are illustrated below.

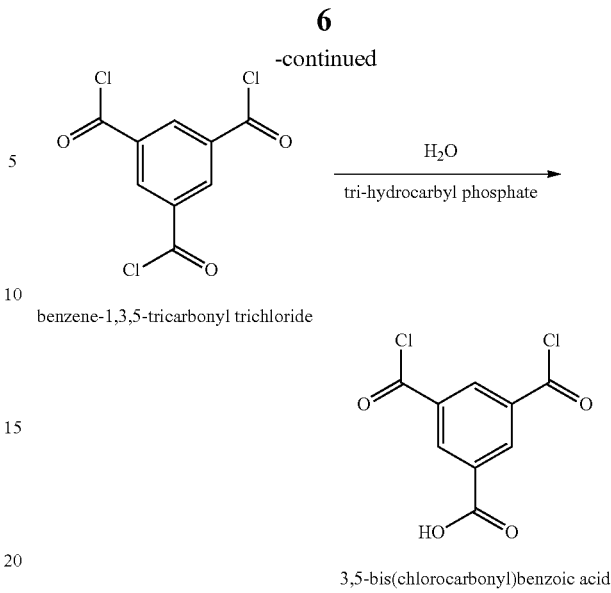

The carboxylic acid monomer typically has a solubility limit of less than 1 wt. % in the hydrocarbon solvent, and in some embodiments less than 0.1 wt %, 0.05 wt %, 0.02 wt % and still others less than even 0.01 wt %. While the carboxylic acid monomer is produced to a molar concentration greater than its solubility limit (e.g. greater than 10% its solubility limit) within the solvent, the monomer remains soluble in solution.

While not wishing to be bound by theory, the subject class of tri-hydrocarbyl phosphate compounds is believed to increase the solubility of water (and the carboxylic acid monomer) within the hydrocarbon solvent and to selectively catalyze the hydrolysis of a portion of the polyfunctional acyl halide monomer. The hydrolyzed product is predominantly the mono-hydrolyzed analog (e.g. more than 70 wt %, 80 wt % and even 90 wt % of the hydrolyzed product is the mono-hydrolyzed form). This technical effect is believed to be unique to the described class of tri-hydrocarbyl phosphate compounds and has been found to produce membranes having improved performance.

In another embodiment, the carboxylic acid monomer is added to the polyfunctional acyl halide coating solution along with the tri-hydrocarbyl phosphate compound. The upper concentration range of carboxylic acid monomer is limited by its solubility within the solution and is dependent upon the concentration of the tri-hydrocarbyl phosphate compound present in solution, i.e. tri-hydrocarbyl phosphate compound is believed to serve as a solubilizer for the carboxylic acid monomer within the solvent. In most embodiments, the upper concentration limit is less than 1 wt %. In one set of embodiments, the carboxylic acid monomer is provided in the solution at concentration of at least 0.01 wt %, 0.02 wt %, 0.03 wt %, 0.04 wt %, 0.05 wt %, 0.06 wt % or even 0.1 wt % while remaining soluble in the coating solution. In another set of embodiments, the coating solution comprises from 0.01 to 1 wt %, 0.02 to 1 wt %, 0.04 to 1 wt % or 0.05 to 1 wt % of the hydrocarbon compound. In yet another set of embodiments, the solution comprises from 0.01 to 10 wt % of the tri-hydrocarbyl phosphate compound. The aforementioned constituents may be combined to form a coating solution preferably comprising at least 80 v/v % hydrocarbon solvent, and in some embodiments at least 90 v/v %, 92 v/v % or 95 v/v % hydrocarbon solvent. The aforementioned constituents may be combined and mixed within a reaction vessel at room temperature. Preferred ratios of carboxylic acid monomer to tri-hydrocarbyl phosphate are from 1:1000 to 2:1 and more preferably 1:100 to 1:1.

The inclusion of the carboxylic acid monomer during interfacial polymerization between the polyfunctional amine and acyl halide monomers results in a membrane having improved performance. And, unlike post hydrolysis reactions that may occur on the surface of the thin-film polyamide layer, the inclusion of the carboxylic acid monomer during interfacial polymerization is believed to result in a polymer structure that is beneficially modified throughout the thin-film layer.

In many embodiments, membranes prepared with the subject monomer exhibit lower solute passage when compared with substantially similar membranes prepared without. And surprising, in many embodiments membranes prepared with the subject monomer exhibit higher flux.

While not limited to a particular type of polyamide membrane, the subject invention is particularly suited for application to composite membranes such as those commonly used in RO and NF applications, and more particularly to flat sheet composite polyamide membranes used in RO and NF applications. The thin film polyamide layer may optionally include hygroscopic polymers upon at least a portion of its surface. Such polymers include polymeric surfactants, polyacrylic acid, polyvinyl acetate, polyalkylene oxide compounds, poly (oxazoline) compounds, polyacrylamides and related reaction products as generally described in U.S. Pat. No. 6,280,853; U.S. Pat. No. 7,815,987; U.S. Pat. No. 7,918,349; U.S. Pat. No. 7,905,361 and US 2011/0220569. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. It will be understood that the various coating operations may be combined or bifurcated in to separated steps, e.g. the polyfunctional acyl halide and carboxylic acid monomer may be coated from a common coating solution, from separate solutions, or from multiple coating solutions including various ratios of each.

The entire subject matter of each of the aforementioned US patent documents are incorporated herein by reference.

EXAMPLES

Preparation of mono-hydrolyzed polyfunctional acid chlorides: High purity mono-hydrolyzed polyfunctional acid chlorides can be obtained via a variety of routes, including for example, preparing a starter solution by combining a polyfunctional acid chloride (many of which are commercially available (e.g., trimesoyl chloride (TMC) and isophthaloyl chloride (IPC)), trialkylphosphate (e.g. tributylphosphate (TBP) and triethylphosphate (TEP), and trace levels of water in 100 mL of a non-polar solvent in quantities described as an example in Table A. The starter solution is allowed to stir for 14-20 hours at which time an additional 1 g of the polyfunctional acid chloride and 0.0076 mL of water are added. The solution is allowed to stir for 1-2 hours and an additional 0.0076 mL of water is added. This is repeated until a total of 4 additions of 0.0076 mL of water are added to the starter solution. During the reaction the mono-hydrolyzed polyfunctionalized acid chloride precipitates out of the solution. The white precipitate can be collected using filter paper and washed repeatedly with fresh solvent yielding high purity mono-hydrolyzed polyfunctional acid chloride.

TABLE A

| Ex. No. | Acid Chloride type | wt % | Additive type | wt % | Solvent | Water (ppm) | Mono-hydrolyzed prdt. Selectivity (%) |
|---|---|---|---|---|---|---|---|
| A-1 | TMC | 1.2 | TBP | 0.56 | Isopar L | 100 | 99 |
| A-2 | IPC | 1.0 | TBP | 0.48 | Isopar L | 20 | 100 |
| A-3 | TMC | 2.0 | TEP | 0.65 | Isopar L | 20 | 100 |
| A-4 | TMC | 3.9 | TEHP | 1.30 | Isopar L | 20 | 94.8 |
| A-5 | TMC | 2.0 | TBP | 0.65 | 90/10 Isopar L/ toluene | 20 | 100 |

Insitu preparation of mono-hydrolyzed polyfunctional acid chlorides: A solution of 2% w/w trialkylphosphate in Isopar L is combined with 200 ppm water and stirred vigorously for 1 hour. The top Isopar layer is decanted from the water and the polyfunctional acid chloride is added to make a 0.2% w/w solution. The solution is allowed to stir for 72-96 h or until 60-80% hydrolysis of the polyfunctional acid chloride is mono-hydrolyzed (as observed by $^1$H NMR). This solution can be used as a mixture of unreacted polyfunctional acid chloride, mono-hydrolyzed acid chloride, and trialkylphosphate and treated accordingly to provide the recipes described in the examples below.

Aromatic Acid Chlorides with a Carboxylic Acid Group (Examples 1-5):

Unless otherwise stated, all sample membranes were produced using a pilot scale membrane manufacturing line. The raw materials were commercially available through a number of vendors with the exception of the mono-hydrolyzed polyfunctional acid chlorides which were prepared in the pure form or insitu in a concentrate solution as described above. Polysulfone supports were casts from 16.5 wt. % solutions in dimethylformamide (DMF) and subsequently soaked in a 3.5 wt. % meta-phenylene diamine (mPD) aqueous solution. The resulting support was then pulled through a reaction table at constant speed while a thin, uniform layer of a non-polar solution was applied. The non-polar solution included isoparaffinic (ISOPAR L), trimesoyl acyl chloride (TMC), an acid chloride with at least one carboxylate moiety (except for control membranes), and optionally a phosphate additive identified below. Excess non-polar solution was removed and the resulting composite membrane was passed through water rinse tanks and drying ovens. Coupons of the sample membranes were then subjected to standard pressure testing using an aqueous salt solution (2000 ppm NaCl) at 150 psi, pH 8 and at room temperature. The testing results are summarized in the tables provided below each example.

Example 1

1-carboxy-3,5-dichloroformyl benzene (mhTMC)

The non-polar coating solution included a isoparaffinic solvent (ISOPAR L), a combination of trimesoyl acid chloride (TMC) and 1-carboxy-3,5-dichloroformyl benzene (mhTMC) in varying ratios while maintaining the total acid chloride content at 0.26 wt %, and optionally tributyl phosphate (TBP) in a constant stoichiometric molar ratio of 1.1:1 with TMC (with TBP-Table 1A; without TBP-Table 1B).

TABLE 1A (with TBP):

| Sample No. | mhTMC (%) | Flux (GFD) | NaCl Passage (%) | Flux Std. Dev. (GFD) | NaCl Passage Std. Dev. (%) |
|---|---|---|---|---|---|
| 1-1 | 0 | 46.9 | 0.86 | 1.8 | 0.07 |
| 1-2 | 0.0065 | 45.8 | 0.49 | 1.1 | 0.04 |
| 1-3 | 0.013 | 44.1 | 0.42 | 0.9 | 0.06 |
| 1-4 | 0.026 | 43.7 | 0.37 | 2.1 | 0.04 |
| 1-5 | 0.052 | 48.6 | 0.43 | 1.3 | 0.03 |
| 1-6 | 0.078 | 53.6 | 0.75 | 1.4 | 0.06 |

TABLE 1B (no TBP):

| Sample No. | mhTMC (%) | Flux (GDF) | NaCl Passage (%) | Flux Std. Dev. (GFD) | NaCl Passage Std. Dev. (%) |
|---|---|---|---|---|---|
| 1-7 | 0 | 13.6 | 1.10 | 0.6 | 0.4 |
| 1-8 | 0.0065 | 10.1 | 1.18 | 0.9 | 0.04 |
| 1-9 | 0.013 | 11.0 | 1.41 | 0.5 | 0.06 |
| 1-10 | 0.019 | 13.6 | 0.99 | 0.5 | 0.13 |
| 1-11 | 0.26 | 9.0 | 1.81 | 0.5 | 0.06 |

Example 2

3-(chlorocarbonyl)benzoic acid

The non-polar solution used to prepare the sample membranes included TMC and 3-(chlorocarbonyl)benzoic acid (as the subject monomer) within an isoparaffinic solvent (ISOPAR L). The total acyl chloride content of the non-polar solution used to prepare each sample was held constant at 0.21% w/v. The concentration of the subject monomer was varied from 0 to 0.04% w/v while the remaining acyl chloride content was contributed solely by TMC. The non-polar solution also contained approximately 0.27% w/v of tri butyl phosphate (TBP).

TABLE 2

| Sample No. | 3-chlorocarbonyl benzoic acid (% w/v) | Flux (GFD) | NaCl Passage (%) | Flux Std. Dev. (GFD) | NaCl Passage Std. Dev. (%) |
|---|---|---|---|---|---|
| 2-1 | 0 | 50.5 | 0.54% | 1.87 | 0.03% |
| 2-2 | 0.005 | 49.0 | 0.54% | 2.50 | 0.08% |
| 2-3 | 0.01 | 46.6 | 0.40% | 0.93 | 0.00% |
| 2-4 | 0.02 | 46.7 | 0.38% | 0.79 | 0.01% |
| 2-5 | 0.03 | 48.5 | 0.40% | 0.83 | 0.03% |
| 6-2 | 0.04 | 48.9 | 0.51% | 2.92 | 0.10% |

Example 3

3-(chlorocarbonyl)benzoic acid vs.
1,3-benzenedicarbonyl dichloride

The non-polar solution used to prepare the sample membranes included TMC, 3-(chlorocarbonyl)benzoic acid as the subject monomer (Sample 3-3) or 1,3-benzenedicarbonyl dichloride as a comparison monomer (Sample 3-2) within an isoparaffinic solvent (ISOPAR L). The total acyl chloride content of the non-polar solutions used to prepare each sample was held constant at 0.2% w/v. The non-polar solution also contained approximately of 0.27% w/v TBP.

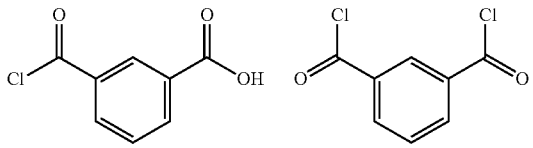

3-(chlorocarbonyl)benzoic acid
(Subject Monomer, 3-3)

1,3-Benzenedicarbonyl dichloride
(Comparison Monomer, 3-2)

TABLE 3

| Sample No. | Monomer Concentration (% w/v) | Flux (GFD) | NaCl Passage (%) | Flux Std. Dev. (GFD) | NaCl Passage Std. Dev. (%) |
|---|---|---|---|---|---|
| 3-1 | 0 | 41.5 | 0.52% | 1.05 | 0.023% |
| 3-2 (Comp) | 0.03 | 37.1 | 0.62% | 0.34 | 0.028% |
| 3-3 | 0.026 | 36.0 | 0.41% | 1.84 | 0.039% |

Example 4

3-(chlorocarbonyl)-5-nitrobenzoic vs.
5-nitroisophthaloyl dichloride

The non-polar solution used to prepare the sample membranes included 3-(chlorocarbonyl)-5-nitrobenzoic as the subject monomer (Sample 4-2) and 5-nitroisophthaloyl dichloride as a comparison monomer (Sample 4-1) within an isoparaffinic solvent (ISOPAR L). The total acyl chloride content of the non-polar solutions used to prepare each sample was held constant at 0.175% w/v. The non-polar solution also contained approximately of 0.195% w/v TBP.

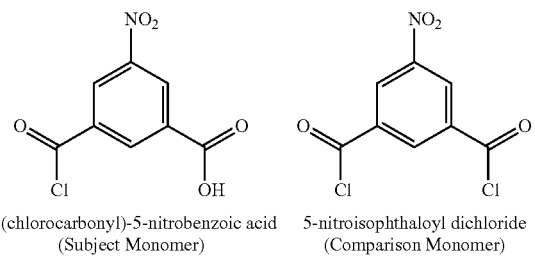

3-(chlorocarbonyl)-5-nitrobenzoic acid
(Subject Monomer)

5-nitroisophthaloyl dichloride
(Comparison Monomer)

TABLE 4

| Sample No. | Monomer Concentration (% w/v) | Flux (GFD) | NaCl Passage (%) | Flux Std. Dev. (GFD) | NaCl Passage Std. Dev. (%) |
|---|---|---|---|---|---|
| 4-1 (Comp) | 0.02 | 36.3 | 0.64% | 0.82 | 0.07% |
| 4-2 | 0.02 | 32.5 | 0.47% | 0.83 | 0.10% |

Example 5

3-(chlorocarbonyl)-5-hydroxybenzoic acid vs.
5-hydroxyisophthaloyl dichloride

The non-polar solution used to prepare the sample membranes included TMC, 3-(chlorocarbonyl)-5-hydroxybenzoic acid as the subject monomer (Sample 5-2) and 5-hydroxyisophthaloyl dichloride as a comparison monomer (Sample 5-1). The total acyl chloride content of the non-polar solutions used to prepare each sample was held constant at 0.175% w/v. The non-polar solution also contained approximately of 0.195% w/v TBP

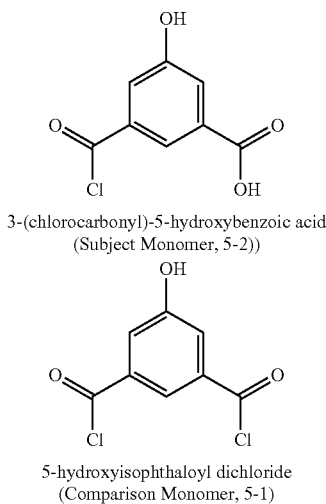

3-(chlorocarbonyl)-5-hydroxybenzoic acid
(Subject Monomer, 5-2))

5-hydroxyisophthaloyl dichloride
(Comparison Monomer, 5-1)

TABLE 5

| Sample No. | Monomer Concentration (% w/v) | Flux (GFD) | NaCl Passage (%) | Flux Std. Dev. (GFD) | NaCl Passage Std. Dev. (%) |
|---|---|---|---|---|---|
| 5-1 (Comp) | 0.02 | 34.3 | 0.69% | 1.16 | 0.08% |
| 5-2 | 0.02 | 33.3 | 0.53% | 1.34 | 0.07% |

Example 6

Evaluation of 3-(chlorocarbonyl)benzoic acid without trialkylphosphate

Hand cast sample composite polyamide membranes were made using an aqueous 3.0 wt. % mPD solution and a non-polar solution including trimesoyl chloride (TMC) and 3-(chlorocarbonyl)benzoic acid as the subject monomer within an isoparaffinic solvent (ISOPAR L). The TMC content of the non-polar solutions used to prepare each sample was held constant at 0.13% w/v. The concentration of the subject monomer was approximately 0.01% w/v in Sample 6-1 and 0% in the control. The non-polar solution also contained 8% mesitylene as a co-solvent with Isopar L. The membranes were tested at 225 psi, 2000 ppm NaCl, pH 8 and room temperature.

TABLE 6

| Sample No. | Monomer Concentration (g/100 ml) | Mean (Avg. Flux GFD) | Mean (Avg. NaCl Passage) | Std Dev (Avg. Flux) | Std Dev (Avg. NaCl Passage) |
|---|---|---|---|---|---|
| Control | 0 | 27.7 | 0.31% | 1.30 | 0.067% |
| 6-1 | 0.01 | 32.1 | 0.42% | — | — |

As demonstrated, membranes prepared with the subject monomers exhibited improved performance, (e.g. higher flux, lower salt passage, or both) when compared with similar control and comparison membranes.

Mono Hydrolyzed Aliphatic Acid Chlorides (Examples 7-13)

All sample membranes were produced using pilot scale membrane manufacturing line. Polysulfone supports were casts from 16.5 wt. % solutions in dimethylformamide (DMF) and subsequently soaked in 3.5 wt. % aqueous solutions of meta-phenylene diamine (mPD). The resulting support was then pulled through a reaction table at constant speed while a thin, uniform layer of a non-polar solution was applied. The non-polar solution included isoparaffinic (ISOPAR L), trimesoyl acid chloride (TMC) and a subject monomer identified below. The non-polar solution also contained TBP (tri butyl phosphate) at a stoichiometric ratio of 1:1.4 with respect to TMC (except for Example 9 where the ratio was 1:1.1). Excess organic solution was removed and the resulting composite membrane was passed through water rinse tanks and drying ovens. The sample membranes were then subject to standard testing under the following conditions: 150 psi, 2000 ppm NaCl, pH 8 at room temperature.

Example 7

Sample composite polyamide membranes were prepared using 4-(chlorocarbonyl)butanoic acid as the "subject monomer." The total acid chloride content of the non-polar solutions used to prepare each sample was held constant at 0.24% w/v. The concentration of the subject monomer was varied from 0 to 0.03% w/v while the remaining acid chloride content was contributed solely by TMC. As shown in Table 7, salt passage decreased from 0.99% to 0.52% with increasing concentrations of 4-(chlorocarbonyl)butanoic acid.

TABLE 7

| | Concentration of 4-(chlorocarbonyl) butanoic acid (% w/v) | Flux (GFD) | NaCl Passage (%) | Flux Std. Dev. (GFD) | NaCl Passage Std. Dev. (%) |
|---|---|---|---|---|---|
| Control | 0 | 41.2 | 0.99% | 0.505 | 0.09% |
| 7-1 | 0.005 | 44.9 | 0.70% | 0.242 | 0.09% |
| 7-2 | 0.011 | 42.1 | 0.58% | 1.068 | 0.04% |
| 7-3 | 0.022 | 40.5 | 0.58% | 1.100 | 0.03% |
| 7-4 | 0.03 | 42.6 | 0.52% | 0.917 | 0.06% |

Example 8

Sample composite polyamide membranes were prepared using 2-(chlorocarbonyl)ethanoic acid as the subject monomer. The total acid chloride content of the non-polar solutions used to prepare each sample was held constant at 0.24% w/v. The concentration of the subject monomer was varied from 0 to 0.03% w/v while the remaining acid chloride content was contributed solely by TMC. As shown in Table 8, salt passage decreased from 1.46% to 0.73% with increasing concentrations of 2-(chlorocarbonyl)ethanoic acid.

TABLE 8

| | Concentration of 2-(chlorocarbonyl) ethanoic acid (% w/v) | Flux (GFD) | NaCl Passage (%) | Flux Std. Dev. (GFD) | NaCl Passage Std. Dev. (%) |
|---|---|---|---|---|---|
| Control | 0 | 46.2 | 1.46% | 1.53 | 0.09% |
| 8-1 | 0.005 | 46.2 | 0.88% | 0.04 | 0.02% |
| 8-2 | 0.011 | 46.3 | 0.81% | 0.70 | 0.06% |
| 8-3 | 0.022 | 44.8 | 0.81% | 0.81 | 0.00% |
| 8-4 | 0.03 | 44.6 | 0.73% | 0.58 | 0.00% |

Example 9

Sample composite polyamide membranes were prepared using 5-chlorocarbonyl pentanoic acid as the subject monomer (Samples 9-2 and 9-4). For comparison, membranes were also prepared with 1,4-dichlorocarbonyl butane and TMC (Comparison Samples 9-1 and 9-3). The total acid chloride content of the non-polar solutions used to prepare each sample was held constant at 0.175% w/v. The concentration of the subject monomer was varied from 0 to 0.02% w/v while the remaining acid chloride content was contributed solely by TMC. As shown in table 9, membranes prepared with the subject monomer, 5-chlorocarbonyl pentanoic acid (Samples 9-2 and 9-4) demonstrated a 30% improvement in salt passage as compared with samples prepared with structurally similar 1,4-dichloro carbonyl butane additive (Samples 9-1 and 9-3).

TABLE 9

| Sample No. | Monomer Concentration (% w/v) | Flux (GFD) | NaCl Passage (%) | Flux Std. Dev. (GFD) | NaCl Passage Std. Dev. (%) |
|---|---|---|---|---|---|
| Control | 0 | 36.7 | 0.65% | 2.57 | 0.06% |
| 9-1 | 0.007 | 34.3 | 0.61% | 1.50 | 0.09% |
| 9-2 | 0.007 | 31.0 | 0.38% | 1.14 | 0.01% |
| 9-3 | 0.02 | 33.8 | 0.70% | 0.60 | 0.10% |
| 9-4 | 0.02 | 32.5 | 0.45% | 0.72 | 0.03% |

Example 10

A sample composite polyamide membrane was prepared using 9-chlorocarbonyl nonanoic acid as the subject monomer. For comparison, a control membrane was also made without the subject monomer. The total acid chloride content of the non-polar solutions used to prepare each sample was held constant at 0.21% w/v. The concentration of the subject monomer was 0.011% w/v while the remaining acid chloride content was contributed solely by TMC. As shown in Table 10, membranes prepared with 9-chlorocarbonyl nonanoic acid showed over 26% improvement in salt passage over the control membrane.

TABLE 10

| Sample No. | Monomer Concentration (% w/v) | Flux (GFD) | NaCl Passage (%) | Flux Std. Dev. (GFD) | NaCl Passage Std. Dev. (%) |
|---|---|---|---|---|---|
| Control | 0 | 38 | 0.53% | 0.55 | 0.02% |
| 10-1 | 0.011 | 34.4 | 0.39% | 1.67 | 0.03% |

Example 11

Sample composite polyamide membranes were made using 2,4-dioxo-3-oxabicyclo[3.3.1]nonane-7-carboxylic acid as the subject monomer. For comparison, a control membrane was also prepared without the subject monomer. The total acid chloride content of the non-polar solutions used to prepare each sample was held constant at 0.24% w/v. The concentration of the subject monomer was 0.03% w/v while the remaining acid chloride content was contributed solely by TMC. As shown in Table 11, the subject monomer showed improvement in salt passage compared with membrane made with only TMC.

TABLE 11

| Sample No. | Monomer Concentration (% w/v) | Flux (GFD) | NaCl Passage (%) | Flux Std. Dev. (GFD) | NaCl Passage Std. Dev. (%) |
|---|---|---|---|---|---|
| Control | 0 | 47.2 | 0.82% | 0.36 | 0.11% |
| 11-1 | 0.03 | 44.3 | 0.63% | 0.97 | 0.04% |

Example 12

Comparison

A sample composite polyamide membrane was prepared using 1,8-dichlorocarbonyloctane in the non-polar phase. For comparison, a control membrane was also prepared without 1,8-dichlorocarbonyloctane. The total acid chloride content of the non-polar solutions used to prepare each sample was held constant at 0.21% w/v. The concentration of the non-hydrolyzed sample monomer, 1,8-dichlorocarbonyloctane, was 0.011% w/v while the remaining acid chloride content was contributed solely by TMC. As shown in Table 12, no substantive improvement in salt passage was observed when the sample polyfunctional acid chloride was not hydrolyzed.

TABLE 12

| Sample No. | Monomer Concentration (% w/v) | Flux (GFD) | NaCl Passage (%) | Flux Std. Dev. (GFD) | NaCl Passage Std. Dev. (%) |
|---|---|---|---|---|---|
| Control | 0 | 41.2 | 0.68% | 0.97 | 0.07% |
| 12-1 | 0.011 | 40.3 | 0.68% | 3.08 | 0.16% |

Example 13

Sample composite polyamide membranes were made using an aqueous 3.5 wt. % mPD solution and a non-polar solution including TMC and 4-(chlorocarbonyl)butanoic acid as the subject monomer within an isoparaffinic solvent (ISOPAR L). The TMC content of the non-polar solutions used to prepare each sample was held constant at 0.11% w/v. No samples included tributylphosphate (TBP). The concentration of the subject monomer was approximately 0.01% w/v in Sample 13-1 and 0% in control. The non-polar solution also contained 4% mesitylene as a co-solvent. Salt passage decreased as a result of the incorporation of 4-(chlorocarbonyl)butanoic acid in the polymer.

TABLE 13

| Sample No. | Monomer Concentration (% w/v) | Flux (GFD) | NaCl Passage (%) | Flux Std. Dev. (GFD) | NaCl Passage Std. Dev. (%) |
|---|---|---|---|---|---|
| Control | 0 | 26.3 | 0.60% | 0.25 | 0.12% |
| 13-1 | 0.01 | 25.7 | 0.56% | 0.42 | 0.02% |

TBP Alternatives to Make Membranes with mhTMC

All sample membranes were produced using hand casting method. Polysulfone supports (cast from 16.5 wt. % solutions in dimethylformamide (DMF)) were soaked in 3.5 wt. % aqueous solutions of meta-phenylene diamine (mPD). The resulting support was then pulled through a reaction table at constant speed while a thin, uniform layer of a non-polar solution was applied. The non-polar solution included isoparaffinic (ISOPAR L), trimesoyl acid chloride (TMC) and an additional additive identified below. Excess non-polar solution was removed by rinsing with hexane and the resulting composite membrane was kept in water. Coupons of the sample membranes were then subject to standard testing using an aqueous salt solution (2000 ppm NaCl) at 225 psi, pH 8 and at room temperature. The testing results are summarized in the tables provided below.

Example 14

Sample composite polyamide membranes were prepared using tris(2-ethyl hexyl)phosphate (TEHP). The total acid chloride content of the non-polar solutions used to prepare each sample was held constant at 0.13% w/v. The concentration of mono-hydrolyzed trimesoyl chloride (referred to as mhTMC) was varied from 0 to 0.03% w/v while the remaining acid chloride content was contributed solely by TMC. The concentration of TEHP was kept constant at 0.235% w/v.

TABLE 14

| Sample No. | mhTMC Conc. (% w/v) | Flux (GFD) | NaCl Passage (%) | Flux Std. Dev. (GFD) | NaCl Passage Std. Dev. (%) |
|---|---|---|---|---|---|
| Control | 0 | 33.09 | 0.41% | 4.10 | 0.17% |
| 14-1 | 0.01 | 22.16 | 0.64% | 1.96 | 0.03% |
| 14-2 | 0.03 | 31.25 | 0.41% | 0.68 | 0.02% |

Example 15

Sample composite polyamide membranes were prepared using triethyl phosphate (TEP). The total acid chloride content of the non-polar solutions used to prepare each sample was held constant at 0.13% w/v. The concentration of mono-hydrolyzed trimesoyl chloride (referred to as mhTMC) was varied from 0 to 0.01% w/v while the remaining acid chloride content was contributed solely by TMC. The concentration of TEP was kept constant at 0.098% w/v.

TABLE 15

| Sample No. | mhTMC Conc. (% w/v) | Flux (GFD) | NaCl Passage (%) | Flux Std. Dev. (GFD) | NaCl Passage Std. Dev. (%) |
|---|---|---|---|---|---|
| Control | 0 | 34.791 | 0.367% | 2.65 | 0.04% |
| 15-1 | 0.01 | 32.752 | 0.34% | 2.65 | 0.04% |

The invention claimed is:

1. A method for making a composite polyamide membrane comprising a porous support and a thin film polyamide layer, wherein the method comprises the step of applying a polyfunctional amine monomer and polyfunctional acid halide monomer to a surface of the porous support and interfacially polymerizing the monomers to form a thin film polyamide layer,
wherein the method is characterized by applying a coating solution to the surface of the porous support comprising:
i) a hydrocarbon solvent;
ii) greater than 0.01 weight percent of an additional monomer comprising a carboxylic acid monomer comprising an aliphatic or aromatic moiety substituted with single carboxylic acid functional group and at least one acyl halide functional group and comprising equal to or less than 30 carbon atoms, and
iii) a tri-hydrocarbyl phosphate compound represented by Formula (I):

Formula (I):

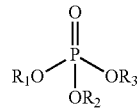

wherein $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen,
wherein the interfacial polymerization is conducted in the presence of the carboxylic acid monomer and tri-hydrocarbyl phosphate compound.

2. The method of claim 1 wherein the coating solution further comprises the polyfunctional acyl halide monomer.

3. The method of claim 2 wherein the coating solution further comprises the polyfunctional acyl halide monomer.

4. The method of claim 2 wherein the carboxylic acid monomer and tri-hydrocarbyl phosphate compound are provided in the coating solution in a molar ratio of from 1:1000 to 2:1.

5. The method of claim 2 wherein the carboxylic acid monomer and tri-hydrocarbyl phosphate compound are provided in the coating solution in a molar ratio of from 1:100 to 1:1.

6. The method of claim 1 wherein the carboxylic acid monomer is present in the coating solution at a concentration greater than its solubility limit in the hydrocarbon solvent but less than its solubility limit in the coating solution.

7. The method of claim 1 wherein the carboxylic acid monomer is present in the coating solution at a concentration greater than 0.02 weight percent.

8. The method of claim 1 wherein the carboxylic acid monomer is a mono-hydrolyzed analog of the polyfunctional monomer.

9. The method of claim 1 wherein the carboxylic acid monomer is formed in-situ within a coating solution prepared by combining water with the polyfunctional acyl halide monomer, tri-hydrocarbyl phosphate compound and a hydrocarbon solvent.

10. The method of claim 9 wherein the coating solution comprises:
   i) water at a concentration of less than 1 wt %,
   ii) the polyfunctional acyl halide monomer at a concentration of less than 10 wt % and
   iii) the tri-hydrocarbyl phosphate compound at a concentration of less than 10 wt %.

11. The method of claim 9 wherein the coating solution comprises:
   i) water at a concentration of less than 0.5 wt %,
   ii) the polyfunctional acyl halide monomer at a concentration of less than 5 wt %, and
   iii) the tri-hydrocarbyl phosphate compound at a concentration of less than 5 wt %.

12. The method of claim 9 wherein the coating solution comprises the polyfunctional acyl halide monomer at a molar ratio with water from 1:2 to 100:1.

13. The method of claim 9 wherein the coating solution comprises the tri-hydrocarbyl phosphate compound at a molar ratio with the polyfunctional acyl halide monomer of 100:1 to 1:1000.

14. The method of claim 9 wherein the coating solutions comprises at least 80 v/v % of the hydrocarbon solvent.

* * * * *